United States Patent
Hinz et al.

(10) Patent No.: US 12,417,559 B2
(45) Date of Patent: Sep. 16, 2025

(54) SEMANTIC IMAGE FILL AT HIGH RESOLUTIONS

(71) Applicant: Adobe Inc., San Jose, CA (US)

(72) Inventors: Tobias Hinz, Ulm (DE); Taesung Park, San Francisco, CA (US); Richard Zhang, San Francisco, CA (US); Matthew David Fisher, Burlingame, CA (US); Difan Liu, Amherst, MA (US); Evangelos Kalogerakis, Sunderland, MD (US)

(73) Assignee: Adobe Inc., San Jose, CA (US)

( * ) Notice: Subject to any disclaimer, the term of this patent is extended or adjusted under 35 U.S.C. 154(b) by 648 days.

(21) Appl. No.: 17/744,995

(22) Filed: May 16, 2022

(65) Prior Publication Data

US 2023/0360376 A1    Nov. 9, 2023

(30) Foreign Application Priority Data

May 3, 2022   (GR) .............................. 20220100358

(51) Int. Cl.
*G06T 11/00* (2006.01)
*G06T 3/4046* (2024.01)
(Continued)

(52) U.S. Cl.
CPC ............ *G06T 11/00* (2013.01); *G06T 3/4046* (2013.01); *G06T 7/11* (2017.01); *G06V 10/235* (2022.01);
(Continued)

(58) Field of Classification Search
CPC ......... G06T 11/00; G06T 3/4046; G06T 7/11; G06T 2207/20084; G06T 2207/20092;
(Continued)

(56) References Cited

U.S. PATENT DOCUMENTS

2017/0371347 A1 * 12/2017 Cohen .................. G05D 1/0246
2019/0333198 A1 * 10/2019 Wang ........................ G06T 5/70
(Continued)

OTHER PUBLICATIONS

Bau, David et al., "Semantic Photo Manipulation with a Generative Image Prior", Cornell University arXiv, arXiv.org [retrieved Jan. 31, 2022]. Retrieved from the Internet <https://arxiv.org/pdf/2005.07727.pdf>., Sep. 12, 2020, 11 pages.
(Continued)

*Primary Examiner* — Ming Y Hon
(74) *Attorney, Agent, or Firm* — FIG. 1 Patents

(57) ABSTRACT

Semantic fill techniques are described that support generating fill and editing images from semantic inputs. A user input, for example, is received by a semantic fill system that indicates a selection of a first region of a digital image and a corresponding semantic label. The user input is utilized by the semantic fill system to generate a guidance attention map of the digital image. The semantic fill system leverages the guidance attention map to generate a sparse attention map of a second region of the digital image. A semantic fill of pixels is generated for the first region based on the semantic label and the sparse attention map. The edited digital image is displayed in a user interface.

20 Claims, 11 Drawing Sheets
(6 of 11 Drawing Sheet(s) Filed in Color)

(51) Int. Cl.
  | | |
  |---|---|
  | *G06T 7/11* | (2017.01) |
  | *G06V 10/22* | (2022.01) |
  | *G06V 10/40* | (2022.01) |
  | *G06V 10/44* | (2022.01) |
  | *G06V 10/774* | (2022.01) |
  | *G06V 10/82* | (2022.01) |
  | *G06V 20/70* | (2022.01) |

(52) U.S. Cl.
  CPC ............ *G06V 10/44* (2022.01); *G06V 10/513* (2022.01); *G06V 10/7753* (2022.01); *G06V 10/82* (2022.01); *G06V 20/70* (2022.01); *G06T 2207/20084* (2013.01); *G06T 2207/20092* (2013.01)

(58) Field of Classification Search
  CPC .... G06V 10/235; G06V 10/44; G06V 10/513; G06V 10/7753; G06V 10/82; G06V 20/70
  See application file for complete search history.

(56) References Cited

U.S. PATENT DOCUMENTS

| | | | | |
|---|---|---|---|---|
| 2021/0090289 | A1* | 3/2021 | Karanam | G06T 7/337 |
| 2022/0327657 | A1* | 10/2022 | Zheng | G06V 10/82 |
| 2025/0104291 | A1* | 3/2025 | Yamada | G06T 5/70 |

OTHER PUBLICATIONS

Beltagy, IZ et al., "Longformer: The Long-Document Transformer", Cornell University arXiv, arXiv.org [retrieved Jan. 31, 2022]. Retrieved from the Internet <https://arxiv.org/pdf/2004.05150.pdf>., Dec. 2, 2020, 17 Pages.

Caesar, Holger et al., "COCO-Stuff: Thing and Stuff Classes in Context", Cornell University arXiv, arXiv.org [retrieved Jan. 31, 2022]. Retrieved from the Internet <https://arxiv.org/pdf/1612.03716.pdf>., Mar. 28, 2018, 10 Pages.

Cao, Chenjie et al., "The Image Local Autoregressive Transformer", Cornell University arXiv, arXiv.org [retrieved Feb. 2, 2022]. Retrieved from the Internet <https://arxiv.org/pdf/2106.02514.pdf>., Oct. 18, 2021, 20 Pages.

Chen, Jiawen et al., "Bilateral guided upsampling", ACM Transactions on Graphics, vol. 35, No. 6 [retrieved Feb. 2, 2022]. Retrieved from the Internet <https://people.csail.mit.edu/hasinoff/pubs/ChenEtAl16-bgu.pdf>., Dec. 5, 2016, 8 Pages.

Chen, Liang-Chieh et al., "DeepLab: Semantic Image Segmentation with Deep Convolutional Nets, Atrous Convolution, and Fully Connected CRFs", Cornell University arXiv, arXiv.org [retrieved Feb. 2, 2022]. Retrieved from the Internet <https://arxiv.org/pdf/1606.00915.pdf>., May 12, 2017, 14 pages.

Chen, Mark et al., "Generative Pretraining From Pixels", Proceedings of the 37th International Conference on Machine Learning [retrieved Feb. 2, 2022]. Retrieved from the Internet <https://www.gwern.net/docs/ai/2020-chen.pdf>., Jul. 12, 2020, 12 Pages.

Chen, Qifeng et al., "Photographic Image Synthesis with Cascaded Refinement Networks", Proceedings of the IEEE International Conference on Computer Vision [retrieved Feb. 2, 2022]. Retrieved from the Internet <https://cqf.io/papers/Photographic_Image_Synthesis_ICCV2017.pdf>., Jul. 28, 2017, 10 pages.

Cheng, Yu et al., "Sequential Attention GAN for Interactive Image Editing", Proceedings of the 28th ACM International Conference on Multimedia [retrieved Feb. 2, 2022]. Retrieved from the Internet <https://arxiv.org/pdf/1812.08352.pdf>., Oct. 12, 2020, 9 Pages.

Child, Rewon et al., "Generating Long Sequences with Sparse Transformers", Cornell University arXiv, arXiv.org [retrieved Feb. 2, 2022]. Retrieved from the Internet <https://arxiv.org/pdf/1904.10509.pdf>., Apr. 23, 2019, 10 Pages.

Chu, Xiangxiang et al., "Conditional Positional Encodings for Vision Transformers", Cornell University arXiv, arXiv.org [retrieved Feb. 2, 2022]. Retrieved from the Internet <https://arxiv.org/pdf/2102.10882.pdf>., Mar. 18, 2021, 13 Pages.

Chu, Xiangxiang et al., "Twins: Revisiting the Design of Spatial Attention in Vision Transformers", Cornell University arXiv, arXiv.org [retrieved Feb. 2, 2022]. Retrieved from the Internet <http://arxiv-export-lb.library.cornell.edu/pdf/2104.13840>., Sep. 30, 2021, 14 Pages.

De Lutio, Riccardo et al., "Guided Super-Resolution As Pixel-to-Pixel Transformation", Cornell University arXiv, arXiv.org [retrieved Feb. 3, 2022]. Retrieved from the Internet <http://128.84.21.203/pdf/1904.01501>., Aug. 15, 2019, 10 Pages.

Dhamo, Helisa et al., "Semantic Image Manipulation Using Scene Graphs", Cornell University arXiv, arXiv.org [retrieved Feb. 2, 2022]. Retrieved from the Internet <https://arxiv.org/pdf/2004.03677.pdf>., Apr. 7, 2020, 15 Pages.

Dosovitskiy, Alexey et al., "An Image is Worth 16×16 Words: Transformers for Image Recognition at Scale", Cornell University arXiv, arXiv.org [retrieved Aug. 2, 2022]. Retrieved from the Internet <https://arxiv.org/pdf/2010.11929.pdf>., Jun. 3, 2021, 22 Pages.

Esser, Patrick et al., "ImageBART: Bidirectional Context with Multinomial Diffusion for Autoregressive Image Synthesis", Cornell University arXiv, arXiv.org [retrieved Feb. 3, 2022]. Retrieved from the Internet <https://arxiv.org/pdf/2108.08827.pdf>., Aug. 19, 2021, 32 Pages.

Esser, Patrick et al., "Taming Transformers for High-Resolution Image Synthesis", Cornell University arXiv, arXiv.org [retrieved Feb. 3, 2022]. Retrieved from the Internet <https://arxiv.org/pdf/2012.09841.pdf>., Jun. 23, 2021, 52 Pages.

Ferstl, David et al., "Image Guided Depth Upsampling Using Anisotropic Total Generalized Variation", Proceedings of the 2013 IEEE International Conference on Computer Vision [retrieved Feb. 3, 2022]. Retrieved from the Internet <https://citeseerx.ist.psu.edu/viewdoc/download?doi=10.1.1.924.3818&rep=rep1&type=pdf>., Dec. 1, 2013, 8 Pages.

Gu, Shuyang et al., "Mask-Guided Portrait Editing With Conditional GANs", Cornell University arXiv, arXiv.org [retrieved Feb. 3, 2022]. Retrieved from the Internet <https://arxiv.org/pdf/1905.10346.pdf>., May 24, 2019, 10 Pages.

Heusel, Martin et al., "GANs Trained by a Two Time-Scale Update Rule Converge to a Local Nash Equilibrium", NIPS'17: Proceedings of the 31st International Conference on Neural Information Processing Systems [retrieved Feb. 17, 2022]. Retrieved from the Internet <https://proceedings.neurips.cc/paper/2017/file/8a1d694707eb0fefe65871369074926d-Paper.pdf>., Jan. 12, 2018, 12 pages.

Hinz, Tobias et al., "Generating Multiple Objects at Spatially Distinct Locations", Cornell University arXiv, arXiv.org [retrieved Feb. 3, 2022]. Retrieved from the Internet <https://arxiv.org/pdf/1901.00686.pdf>., Jan. 3, 2019, 23 Pages.

Hinz, Tobias et al., "Improved Techniques for Training Single-Image GANs", Cornell University arXiv, arXiv.org [retrieved Feb. 3, 2022]. Retrieved from the Internet <https://arxiv.org/pdf/2003.11512.pdf>., Nov. 17, 2020, 10 Pages.

Holtzman, Ari et al., "The Curious Case of Neural Text Degeneration", Cornell University arXiv, arXiv.org [retrieved Feb. 3, 2022]. Retrieved from the Internet <https://arxiv.org/pdf/1904.09751.pdf>., Feb. 14, 2020, 16 Pages.

Hong, Seunghoon et al., "Learning Hierarchical Semantic Image Manipulation through Structured Representations", Cornell University arXiv, arXiv.org [retrieved Feb. 3, 2022]. Retrieved from the Internet <https://arxiv.org/pdf/1808.07535.pdf>., Aug. 28, 2018, 18 Pages.

Hui, Tak-Wai et al., "Depth Map Super-Resolution by Deep Multi-Scale Guidance", European Conference on Computer Vision [retrieved Feb. 3, 2022]. Retrieved from the Internet <https://doi.org/10.1007/978-3-319-46487-9_22>., Sep. 2016, 17 Pages.

Isola, Phillip et al., "Image-to-Image Translation with Conditional Adversarial Networks", 2017 IEEE Conference on Computer Vision and Pattern Recognition (CVPR) [retrieved Feb. 24, 2022]. Retrieved from the Internet <https://gangw.web.illinois.edu/class/cs598/papers/CVPR17-img2img.pdf>., Nov. 22, 2017, 17 pages.

(56) References Cited

OTHER PUBLICATIONS

Jiang, Yifan et al., "TransGAN: Two Pure Transformers Can Make One Strong GAN, and That Can Scale Up", Cornell University arXiv, arXiv.org [retrieved Feb. 3, 2022]. Retrieved from the Internet <https://arxiv.org/pdf/2102.07074.pdf>., Dec. 9, 2021, 19 Pages.

Jo, Youngjoo et al., "SC-FEGAN: Face Editing Generative Adversarial Network With User's Sketch and Color", Cornell University arXiv, arXiv.org [retrieved Feb. 3, 2022]. Retrieved from the Internet <https://arxiv.org/pdf/1902.06838.pdf>., Feb. 18, 2019, 10 Pages.

Kitaev, Nikita et al., "Reformer: The Efficient Transformer", Cornell University arXiv, arXiv.org [retrieved Feb. 3, 2022]. Retrieved from the Internet <https://arxiv.org/pdf/2001.04451.pdf>., Feb. 18, 2020, 12 Pages.

Kopf, Johannes et al., "Joint Bilateral Upsampling", ACM Transactions on Graphics (Proceedings of SIGGRAPH) [retrieved Feb. 3, 2022]. Retrieved from the Internet <https://johanneskopf.de/publications/jbu/paper/FinalPaper_0185.pdf>., Jul. 2007, 5 pages.

Lee, Cheng-Han et al., "MaskGAN: Towards Diverse and Interactive Facial Image Manipulation", Cornell University arXiv, arXiv.org [retrieved Feb. 3, 2022]. Retrieved from the Internet <https://arxiv.org/pdf/1907.11922.pdf>., Apr. 1, 2020, 20 Pages.

Lewis, Mike et al., "BART: Denoising Sequence-to-Sequence Pre-training for Natural Language Generation, Translation, and Comprehension", Cornell University arXiv, arXiv.org [retrieved Apr. 28, 2022]. Retrieved from the Internet <https://arxiv.org/pdf/1910.13461.pdf>., Oct. 29, 2019, 10 Pages.

Ling, Huan et al., "EditGAN: High-Precision Semantic Image Editing", Cornell University arXiv, arXiv.org [retrieved Feb. 3, 2022]. Retrieved from the Internet <https://arxiv.org/pdf/2111.03186.pdf>., Nov. 4, 2021, 38 Pages.

Liu, Guilin et al., "Image Inpainting for Irregular Holes Using Partial Convolutions", Cornell University arXiv, arXiv.org [retrieved Feb. 3, 2022]. Retrieved from the Internet <https://arxiv.org/pdf/1804.07723.pdf>., Dec. 15, 2018, 23 Pages.

Liu, Hongyu et al., "DeFLOCNet: Deep Image Editing via Flexible Low-Level Controls", Cornell University arXiv, arXiv.org [retrieved Feb. 3, 2022]. Retrieved from the Internet <https://arxiv.org/pdf/2103.12723.pdf>., Mar. 23, 2021, 10 Pages.

Liu, Hongyu et al., "PD-GAN: Probabilistic Diverse GAN for Image Inpainting", Cornell University arXiv, arXiv.org [retrieved Feb. 3, 2022]. Retrieved from the Internet <https://arxiv.org/pdf/2105.02201.pdf>., May 5, 2021, 10 Pages.

Liu, Ming-Yu et al., "Joint Geodesic Upsampling of Depth Images", Proceedings of the 2013 IEEE Conference on Computer Vision and Pattern Recognition [retrieved Feb. 3, 2022]. Retrieved from the Internet <https://www.merl.com/publications/docs/TR2013-042.pdf>., Jun. 23, 2013, 10 Pages.

Liu, Ze et al., "Swin Transformer: Hierarchical Vision Transformer Using Shifted Windows", Cornell University arXiv, arXiv.org [retrieved Feb. 3, 2022]. Retrieved from the Internet <https://arxiv.org/pdf/2103.14030.pdf>., Aug. 17, 2021, 14 Pages.

Loshchilov, Ilya et al., "Decoupled Weight Decay Regularization", Cornell University arXiv, arXiv.org [retrieved Feb. 3, 2022]. Retrieved from the Internet <https://arxiv.org/pdf/1711.05101.pdf>., Jan. 4, 2019, 19 Pages.

Nam, Seonghyeon et al., "Text-Adaptive Generative Adversarial Networks: Manipulating Images with Natural Language", Cornell University arXiv, arXiv.org [retrieved Feb. 3, 2022]. Retrieved from the Internet <https://arxiv.org/pdf/1810.11919.pdf>., Nov. 28, 2018, 10 Pages.

Ntavelis, Evangelos et al., "SESAME: Semantic Editing of Scenes by Adding, Manipulating or Erasing Objects", Cornell University arXiv, arXiv.org [retrieved Feb. 3, 2022]. Retrieved from the Internet <https://arxiv.org/pdf/2004.04977.pdf>., Oct. 8, 2020, 26 Pages.

Park, Jaesik et al., "High quality depth map upsampling for 3D-TOF cameras", Proceedings of the 2011 International Conference on Computer Vision [retrieved Feb. 3, 2022]. Retrieved from the Internet <http://www.cse.yorku.ca/~mbrown/pdf/iccv11_depthmapupsampling.pdf>., Nov. 6, 2011, 8 Pages.

Park, Taesung et al., "Semantic Image Synthesis With Spatially-Adaptive Normalization", Cornell University arXiv, arXiv.org [retrieved Feb. 3, 2022]. Retrieved from the Internet <https://arxiv.org/pdf/1903.07291.pdf>., Nov. 5, 2019, 19 Pages.

Parmar, Niki et al., "Image Transformer", Cornell University arXiv, arXiv.org [retrieved Feb. 3, 2022]. Retrieved from the Internet <https://arxiv.org/pdf/1802.05751.pdf>., Jun. 15, 2018, 10 Pages.

Patashnik, Or et al., "StyleCLIP: Text-Driven Manipulation of StyleGAN Imagery", Cornell University arXiv, arXiv.org [retrieved Feb. 3, 2022]. Retrieved from the Internet <https://arxiv.org/pdf/2103.17249.pdf>., Mar. 31, 2021, 18 Pages.

Ramesh, Aditya et al., "Zero-Shot Text-to-Image Generation", Cornell University arXiv, arXiv.org [retrieved Feb. 3, 2022]. Retrieved from the Internet <https://arxiv.org/pdf/2102.12092.pdf>., Feb. 26, 2021, 20 Pages.

Shaham, Tamar R. et al., "SinGAN: Learning a Generative Model From a Single Natural Image", Cornell University arXiv, arXiv.org [retrieved Feb. 3, 2022]. Retrieved from the Internet <https://arxiv.org/pdf/1905.01164.pdf>., Sep. 4, 2019, 11 Pages.

Shaham, Tamar R. et al., "Spatially-Adaptive Pixelwise Networks for Fast Image Translation", Cornell University arXiv, arXiv.org [retrieved Feb. 3, 2022]. Retrieved from the Internet <https://arxiv.org/pdf/2012.02992.pdf>., Dec. 5, 2020, 10 Pages.

Shocher, Assaf et al., ""Zero-Shot" Super-Resolution Using Deep Internal Learning", Cornell University arXiv, arXiv.org [retrieved Feb. 3, 2022]. Retrieved from the Internet <https://arxiv.org/pdf/1712.06087.pdf>., Dec. 17, 2017, 9 Pages.

Su, Sitong et al., "Fully Functional Image Manipulation Using Scene Graphs in A Bounding-Box Free Way", Proceedings of the 29th ACM International Conference on Multimedia [retrieved May 26, 2022]. Retrieved from the Internet <https://doi.org/10.1145/3474085.3475326>., Oct. 17, 2021, 9 pages.

Suvorov, Roman et al., "Resolution-Robust Large Mask Inpainting With Fourier Convolutions", Cornell University arXiv, arXiv.org [retrieved Feb. 3, 2022]. Retrieved from the Internet <https://arxiv.org/pdf/2109.07161.pdf>., Sep. 2021, 11 Pages.

Tan, Zhentao et al., "Diverse Semantic Image Synthesis via Probability Distribution Modeling", Cornell University arXiv, arXiv.org [retrieved Feb. 3, 2022]. Retrieved from the Internet <https://arxiv.org/pdf/2103.06878.pdf>., Mar. 11, 2021, 18 Pages.

Tay, Yi et al., "Efficient Transformers: A Survey", Cornell University arXiv, arXiv.org [retrieved Feb. 3, 2022]. Retrieved from the Internet <https://arxiv.org/pdf/2009.06732.pdf>., Sep. 16, 2020, 28 Pages.

Tulsiani, Shubham et al., "PixelTransformer: Sample Conditioned Signal Generation", Cornell University arXiv, arXiv.org [retrieved Feb. 3, 2022]. Retrieved from the Internet <https://arxiv.org/pdf/2103.15813.pdf>., Mar. 29, 2021, 10 Pages.

Vaswani, Ashish et al., "Attention Is All You Need", Cornell University arXiv Preprint, arXiv.org [retrieved Feb. 17, 2022]. Retrieved from the Internet <https://arxiv.org/pdf/1706.03762.pdf>., Dec. 6, 2017, 15 pages.

Verdoliva, Luisa, "Media Forensics and DeepFakes: An Overview", Cornell University arXiv, arXiv.org [retrieved Feb. 3, 2022]. Retrieved from the Internet <https://arxiv.org/pdf/2001.06564.pdf>., Jan. 18, 2020, 24 Pages.

Mnker, Yael et al., "Image Shape Manipulation From a Single Augmented Training Sample", Cornell University arXiv, arXiv.org [retrieved Feb. 3, 2022]. Retrieved from the Internet <https://openaccess.thecvf.com/content/ICCV2021/papers/Vinker_Image_Shape_Manipulation_From_a_Single_Augmented_Training_Sample_ICCV_2021_paper.pdf>., Sep. 2021, 10 Pages.

Wan, Ziyu et al., "High-Fidelity Pluralistic Image Completion with Transformers", Cornell University arXiv, arXiv.org [retrieved Feb. 3, 2022]. Retrieved from the Internet <https://arxiv.org/pdf/2103.14031.pdf>., Mar. 25, 2021, 10 Pages.

Wang, Run et al., "FakeSpotter: A Simple yet Robust Baseline for Spotting AI-Synthesized Fake Faces", Cornell University arXiv, arXiv.org [retrieved Feb. 3, 2022]. Retrieved from the Internet <https://arxiv.org/pdf/1909.06122.pdf>., Jul. 16, 2020, 8 Pages.

(56) References Cited

OTHER PUBLICATIONS

Wang, Sheng-Yu et al., "CNN-Generated Images Are Surprisingly Easy to Spot . . . for Now", Cornell University arXiv, arXiv.org [retrieved Feb. 3, 2022]. Retrieved from the Internet <https://arxiv.org/pdf/1912.11035.pdf>., Apr. 4, 2020, 13 Pages.

Wang, Sinong et al., "Linformer: Self-Attention with Linear Complexity", Cornell University arXiv, arXiv.org [retrieved Feb. 3, 2022]. Retrieved from the Internet <https://arxiv.org/pdf/2006.04768.pdf>., Jun. 14, 2020, 12 Pages.

Wang, Wenhai et al., "Pyramid Vision Transformer: A Versatile Backbone for Dense Prediction Without Convolutions", Cornell University arXiv, arXiv.org [retrieved Feb. 3, 2022]. Retrieved from the Internet <https://arxiv.org/pdf/2102.12122.pdf>., Aug. 11, 2021, 15 Pages.

Wang, Xiaolong et al., "Non-local Neural Networks", Cornell University arXiv, arXiv.org [retrieved Feb. 3, 2022]. Retrieved from the Internet <https://arxiv.org/pdf/1711.07971.pdf>., Apr. 13, 2018, 10 pages.

Wang, Zhou et al., "Image Quality Assessment: From Error Visibility to Structural Similarity", IEEE Transactions on Image Processing, vol. 13, No. 4 [retrieved Feb. 3, 2022]. Retrieved from the Internet <http://www.cns.nyu.edu/pub/lcv/wang03-preprint.pdf>., Apr. 2004, 14 pages.

Yang, Chao et al., "High-Resolution Image Inpainting Using Multi-Scale Neural Patch Synthesis", Cornell University arXiv, arXiv.org [retrieved Feb. 3, 2022]. Retrieved from the Internet <https://arxiv.org/pdf/1611.09969.pdf>., Apr. 13, 2017, 9 Pages.

Yang, Jianwei et al., "Focal Self-attention for Local-Global Interactions in Vision Transformers", Cornell University arXiv, arXiv.org [retrieved Feb. 3, 2022]. Retrieved from the Internet <https://arxiv.org/pdf/2107.00641.pdf>., Jul. 1, 2021, 21 Pages.

Yang, Jingyu et al., "Color-Guided Depth Recovery From RGB-D Data Using an Adaptive Autoregressive Model", IEEE Transactions on Image Processing [retrieved Feb. 3, 2022]. Retrieved from the Internet <http://citeseerx.ist.psu.edu/viewdoc/download?doi=10.1.1.725.6033&rep=rep1&type=pdf>., Jun. 2014, 16 Pages.

Yang, Qingxiong et al., "Spatial-Depth Super Resolution for Range Images", IEEE Conference on Computer Vision and Pattern Recognition [retrieved Feb. 3, 2022]. Retrieved from the Internet <https://web.archive.org/web/20081031181724id_/http://vision.ai.uiuc.edu/~qyang6/publications/cvpr-07-qingxiong-yang-small.pdf>., Jun. 2007, 8 Pages.

Yu, Jiahui et al., "Free-Form Image Inpainting With Gated Convolution", Cornell University arXiv, arXiv.org [retrieved Feb. 3, 2022]. Retrieved from the Internet <https://arxiv.org/pdf/1806.03589.pdf>., Oct. 22, 2019, 17 Pages.

Yu, Jiahui et al., "Generative Image Inpainting With Contextual Attention", Cornell University arXiv, arXiv.org [retrieved Feb. 3, 2022]. Retrieved from the Internet <https://arxiv.org/pdf/1801.07892.pdf>., Mar. 21, 2018, 15 Pages.

Yu, Tao Yu et al., "Region Normalization for Image Inpainting", Cornell University arXiv, arXiv.org [retrieved Feb. 3, 2022]. Retrieved from the Internet <https://arxiv.org/pdf/1911.10375.pdf>., Nov. 23, 2019, 9 Pages.

Yu, Yingchen et al., "Diverse Image Inpainting with Bidirectional and Autoregressive Transformers", Cornell University arXiv, arXiv.org [retrieved Feb. 3, 2022]. Retrieved from the Internet <https://arxiv.org/pdf/2104.12335.pdf>., Jun. 1, 2021, 11 Pages.

Zaheer, Manzil et al., "Big Bird: Transformers for Longer Sequences", Cornell University arXiv, arXiv.org [retrieved Feb. 4, 2022]. Retrieved from the Internet <https://arxiv.org/pdf/2007.14062.pdf>., Jan. 8, 2021, 42 Pages.

Zhang, Pan et al., "Cross-Domain Correspondence Learning for Exemplar-Based Image Translation", Cornell University arXiv, arXiv.org [retrieved Feb. 4, 2022]. Retrieved from the Internet <https://arxiv.org/pdf/2004.05571.pdf>., Apr. 12, 2020, 23 Pages.

Zhang, Pengchuan et al., "Multi-Scale Vision Longformer: A New Vision Transformer for High-Resolution Image Encoding", Cornell University arXiv, arXiv.org [retrieved Feb. 4, 2022]. Retrieved from the Internet <https://arxiv.org/pdf/2103.15358.pdf>., May 27, 2021, 18 Pages.

Zhang, Richard et al., "The Unreasonable Effectiveness of Deep Features as a Perceptual Metric", Cornell University arXiv, arXiv.org [retrieved Feb. 17, 2022]. Retrieved from the Internet <https://arxiv.org/pdf/1801.03924.pdf>., Apr. 10, 2018, 14 Pages.

Zheng, Haitian et al., "Semantic Layout Manipulation with High-Resolution Sparse Attention", Cornell University arXiv, arXiv.org [retrieved Feb. 4, 2022]. Retrieved from the Internet <https://arxiv.org/pdf/2012.07288.pdf>., Apr. 16, 2021, 22 Pages.

Zhou, Bolei et al., "Scene Parsing Through ADE20K Dataset", EEE Conference on Computer Vision and Pattern Recognition [retrieved Feb. 4, 2022]. Retrieved from the Internet <https://people.csail.mit.edu/xavierpuig/documents/publications/scene-parse-camera-ready.pdf>., 2017, 9 Pages.

Zhou, Xingran et al., "CoCosNet v2: Full-Resolution Correspondence Learning for Image Translation", IEEE/CVF Conference on Computer Vision and Pattern Recognition [retrieved Feb. 4, 2022]. Retrieved from the Internet <https://arxiv.org/pdf/2012.02047.pdf>., Mar. 30, 2021, 25 Pages.

Zhu, Peihao et al., "SEAN: Image Synthesis With Semantic Region-Adaptive Normalization", Cornell University arXiv, arXiv.org [retrieved Feb. 4, 2022]. Retrieved from the Internet <https://arxiv.org/pdf/1911.12861.pdf>., May 24, 2020, 19 Pages.

* cited by examiner

SEMANTIC IMAGE FILL AT HIGH RESOLUTIONS

CLAIM OF PRIORITY

This application claims priority under 35 USC 119 or 365 to Greek Application No. 20220100358, filed May 3, 2022, the disclosure of which is incorporated in its entirety.

BACKGROUND

Image fill techniques may be used by a processing device to support a variety of digital image processing. In one example, a region of a digital image is filled with generated digital content, e.g., an object is filled with a generated object. Conventional techniques to perform image filling are faced with numerous challenges. Some conventional image fill techniques, when applied to high-resolution images, require large amounts of computational resources, resulting in inhibitive user wait times. Other conventional image fill techniques are based on pixels surrounding a region for replacement in the digital image. However, these techniques often fail due to a lack of an ability to accurately determine long-range dependencies, resulting in unrealistic outputs for complicated scenes.

SUMMARY

Semantic image fill techniques are described, as implemented by a processing device, to generate digital content for a region of a digital image. In one example, a semantic fill system receives a digital image and a semantic input. The semantic input includes a first region of the digital image and a corresponding semantic label indicating a fill for the first region, e.g., "water." The semantic input is utilized by the semantic fill system to generate a guidance attention map of a downsampled version of the digital image. The guidance attention map includes attention values of a second region of the digital image. The semantic fill system identifies key regions of the digital image based on the attention values. A sparse attention map is generated at the resolution of the digital image based on the key regions of the digital image. The sparse attention map is then leveraged to generate content for the first region based on the semantic label. As a result, these techniques significantly reduce the time and computational resources involved in generating content from source digital images at high resolutions, while also considering both short- and long-range dependencies of the source digital images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
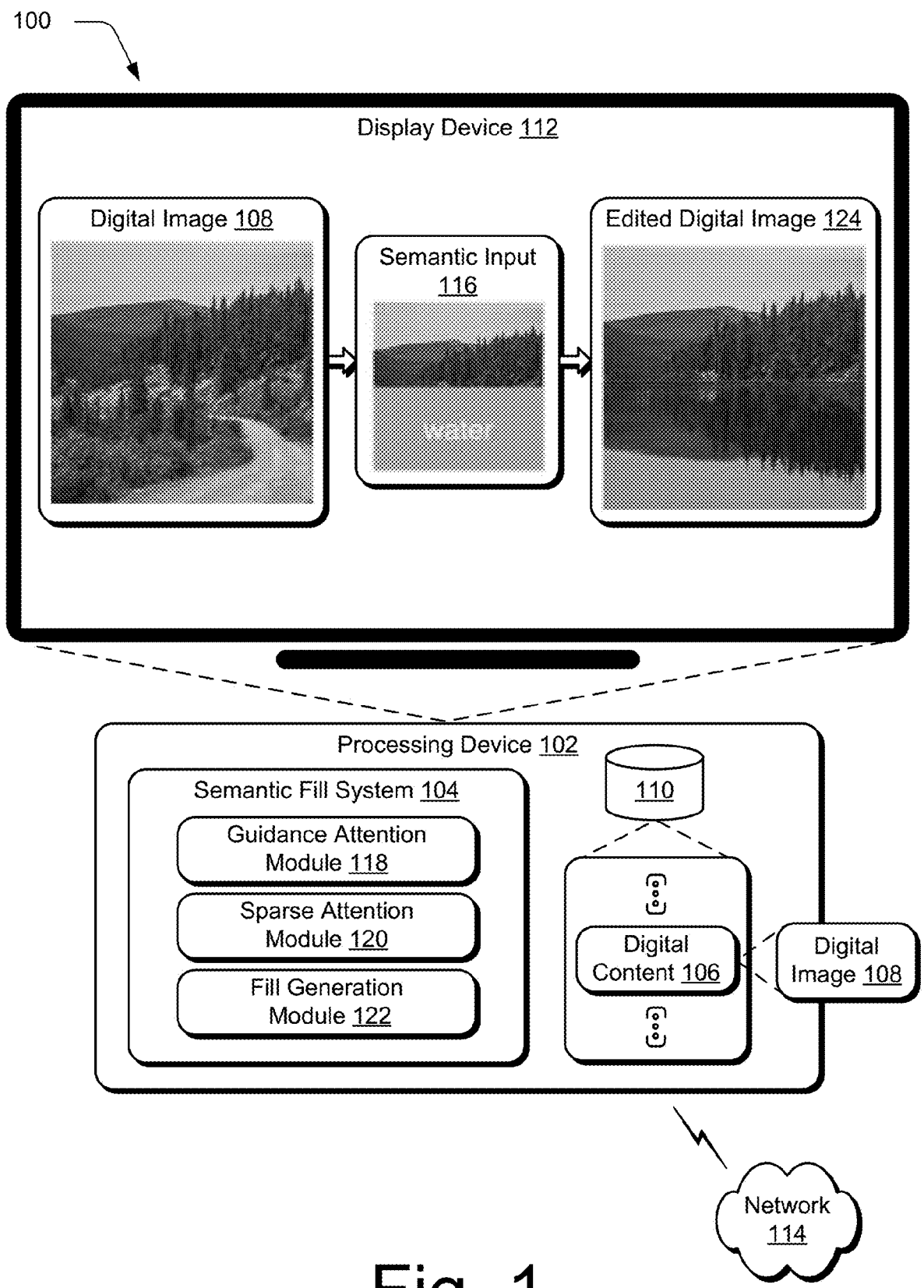
FIG. 1 is an illustration of a digital medium environment in an example implementation that is operable to employ semantic fill techniques described herein.

Conventional techniques used by processing devices to generate fill for regions in a digital image are confronted with a variety of challenges that cause the edited image to look unrealistic. For example, some conventional image fill techniques rely on single-transformer attention mapping. However, these conventional techniques often fail as image resolution increases because the computational resources for attention mapping usually increases quadratically with the input size. This makes single-transformer attention mapping computationally expensive to use for high-resolution image fill.

In another example, conventional techniques based on traditional convolutional neural networks (CNNs) prioritize local interactions between image pixels and, as a result, have difficulty modeling long-range dependencies. Although these conventional fill techniques may operate well for digital images having simple adjustments, these techniques often look unrealistic for replacing regions of the digital image having complex and structured short- and long-range dependencies.

Accordingly, improved image fill techniques are described that are usable to generate a semantic fill for a region of a digital image in an improved and computationally efficient manner over conventional techniques. This is performed by generating a low-resolution attention map as guidance for the generation of a high-resolution attention map that is usable for semantic fill generation. Further, this is performable in real time to generate content that is a "best fit" to the digital image, which is not performable manually by a human being.

Consider an example in which a high-resolution digital image that depicts a mountain (e.g., the top half of the digital image) and a road (e.g., the bottom half of the digital image) is received as an input by a semantic fill system. Additionally, a semantic input is received including a first region of the digital image to be filled and a corresponding semantic label. A semantic label, for instance, is an identifier that has a semantic meaning to a human being, e.g., as a particular object, part of a scene, and so on. Examples of semantic labels include hair, skin, body parts, clothing, animals, cars, landscape features such as grass, water, background, and so forth. In this example, the semantic input is a user selection of a first region of the digital image over the region depicting the road, as well as a user text input as the semantic label, such as "water," indicating that this first region (e.g., the bottom half of the image) is to be filled with "water." A second region of the digital image, such as the top half of the image depicting the mountain, is identified for attention mapping for the first region.

The digital image is downsampled into a lower-resolution digital image. In some instances, the downsampled image is encoded by the semantic fill system as a feature map. The downsampled image is passed to a guidance attention model, e.g., an autoregressive transformer trained using machine learning. In some instances, the downsampled digital image is split by the semantic fill system into first portions of the first region and attention portions of the attention region. For each first portion as a query portion, an initial attention layer is generated using the guidance attention model. In the example of generating a reflection of the mountains on "water," a query portion near the middle of the first region has a higher attention value for a second portion in the middle of the second region (i.e., in a mirrored position relative to the query portion) than a different second portion on the edge of the second region.

Then, the semantic fill system leverages the initial attention layer to generate a guidance attention layer. In some examples, the guidance attention layer is generated by selecting a subset of the second portions based on the corresponding attention values for the corresponding query portion. The guidance attention map includes the generated guidance attention layers for each query portion.

The guidance attention map is utilized by the semantic fill system to generate a sparse attention map at an original (i.e., initial) resolution of the digital image. The guidance attention map is upsampled from the lower resolution to the resolution of the digital image. The sparse attention map is generated using a sparse attention model, e.g., an autoregressive transformer trained using machine learning. The semantic fill system focuses the sparse attention model on the portions of the image identified by the guidance attention map, e.g., by generating a sparse attention layer on the selected second regions of a guidance attention layer. In some instances, the sparse attention layer for a query region is further based on the guidance attention layers of neighboring query regions.

The semantic fill system generates fill for the first region of the digital image based on the sparse attention map and the semantic label. The digital image with the generated fill in the first region is displayed in a user interface, e.g., a mountain with a reflective body of water.

In another example, two semantic inputs are received by the semantic fill system. In this example, the semantic fill system determines an order for the semantic inputs to be processed. For instance, if a first semantic input region (e.g., "water" on the bottom half of the digital image described above) depends on a second semantic input region (e.g., a "tree" on the depicted mountains on the top half of the digital image), then the second semantic input is ordered to be processed before the first semantic input.

While conventional fill techniques are computationally expensive for handling high-resolution images or are overly constrained within specific image regions hampering long-range interactions, the techniques described herein are both computationally efficient and effective. By reducing the amount of the digital image analyzed at a high resolution for the sparse attention map, the semantic fill system is able to capture high-quality long-range interactions and context, while also reducing the computational resources required to perform high-resolution attention mapping. This leads to synthesizing interesting phenomena in scenes, such as reflections of landscapes onto water or flora consistent with the rest of the landscape, which were not possible to generate reliably with conventional techniques at high resolutions. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ semantic fill techniques described herein. The illustrated environment 100 includes a processing device 102, which is configurable in a variety of ways.

The processing device 102, for instance, is configurable as a desktop computer, a laptop computer, a mobile device (e.g., assuming a handheld configuration such as a tablet or mobile phone), and so forth. Thus, the processing device 102 ranges from full resource devices with substantial memory and processor resources (e.g., personal computers, game consoles) to a low-resource device with limited memory and/or processing resources (e.g., mobile devices). Additionally, although a single processing device 102 is shown, the processing device 102 is also representative of a plurality of different devices, such as multiple servers utilized by a business to perform operations "over the cloud" as described in FIG. 11.

The processing device 102 is illustrated as including a semantic fill system 104. The semantic fill system 104 is implemented at least partially in hardware of the processing device 102 to process and transform digital content 106, such as a digital image 108, which is illustrated as maintained in a storage device 110 of the processing device 102. Such processing includes creation of the digital image 108, modification of the digital image 108, and rendering of the digital image 108 in a display, e.g., on a display device 112. Although illustrated as implemented locally at the processing device 102, functionality of the semantic fill system 104 is also configurable as whole or part via functionality available via the network 114, such as part of a web service or "in the cloud."

An example of functionality incorporated by the semantic fill system 104 to process the digital image 108 based on a semantic input 116 is illustrated as a guidance attention module 118, a sparse attention module 120, and a fill generation module 122. The semantic fill system 104 is configured to generate an edited digital image 124 via attention mapping of the digital image.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Semantic Image Fill at High Resolutions

Figure 2:
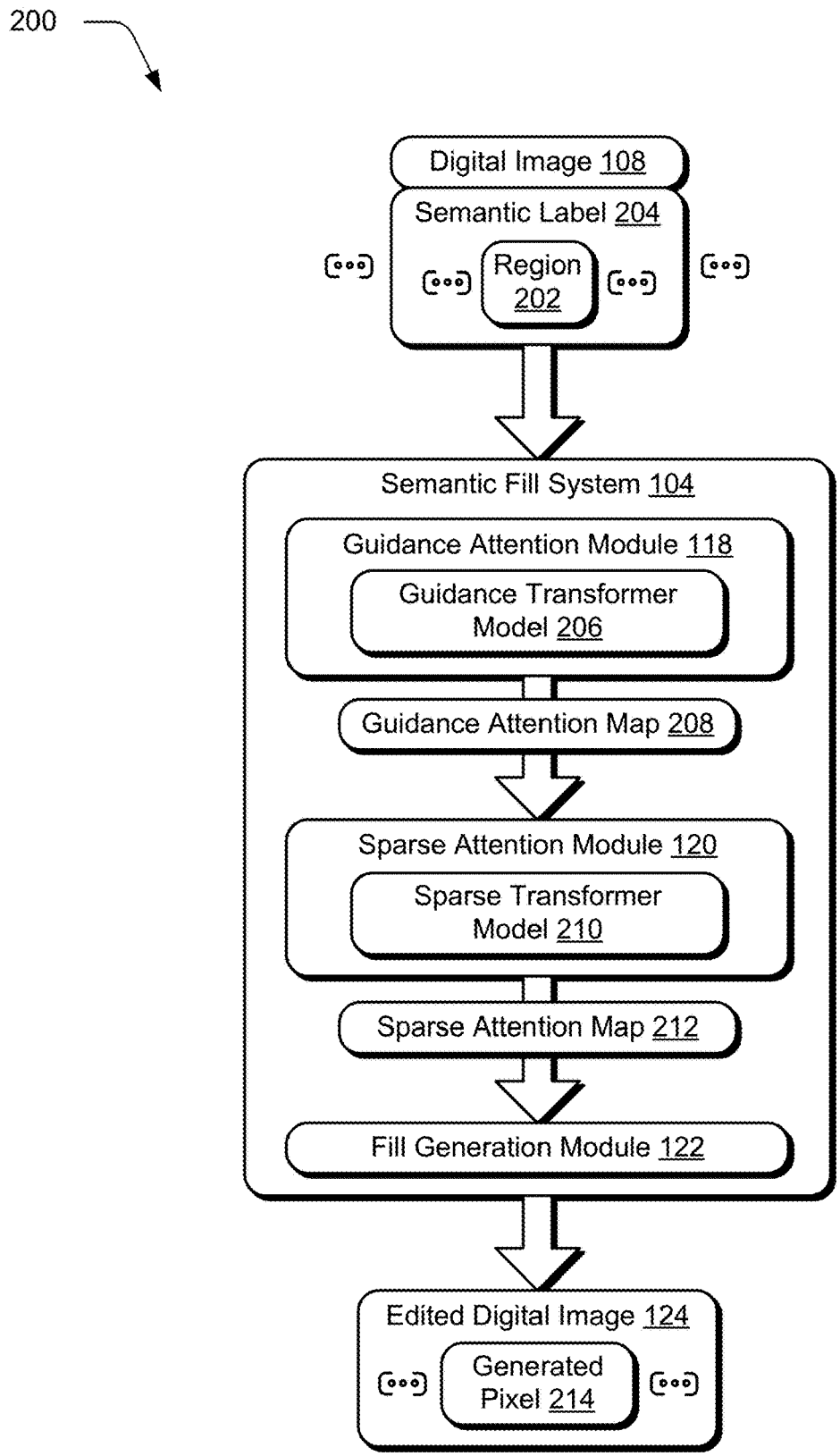
FIG. 2 depicts a system in an example implementation showing operation of a semantic fill system of FIG. 1 in greater detail.
Figure 3:
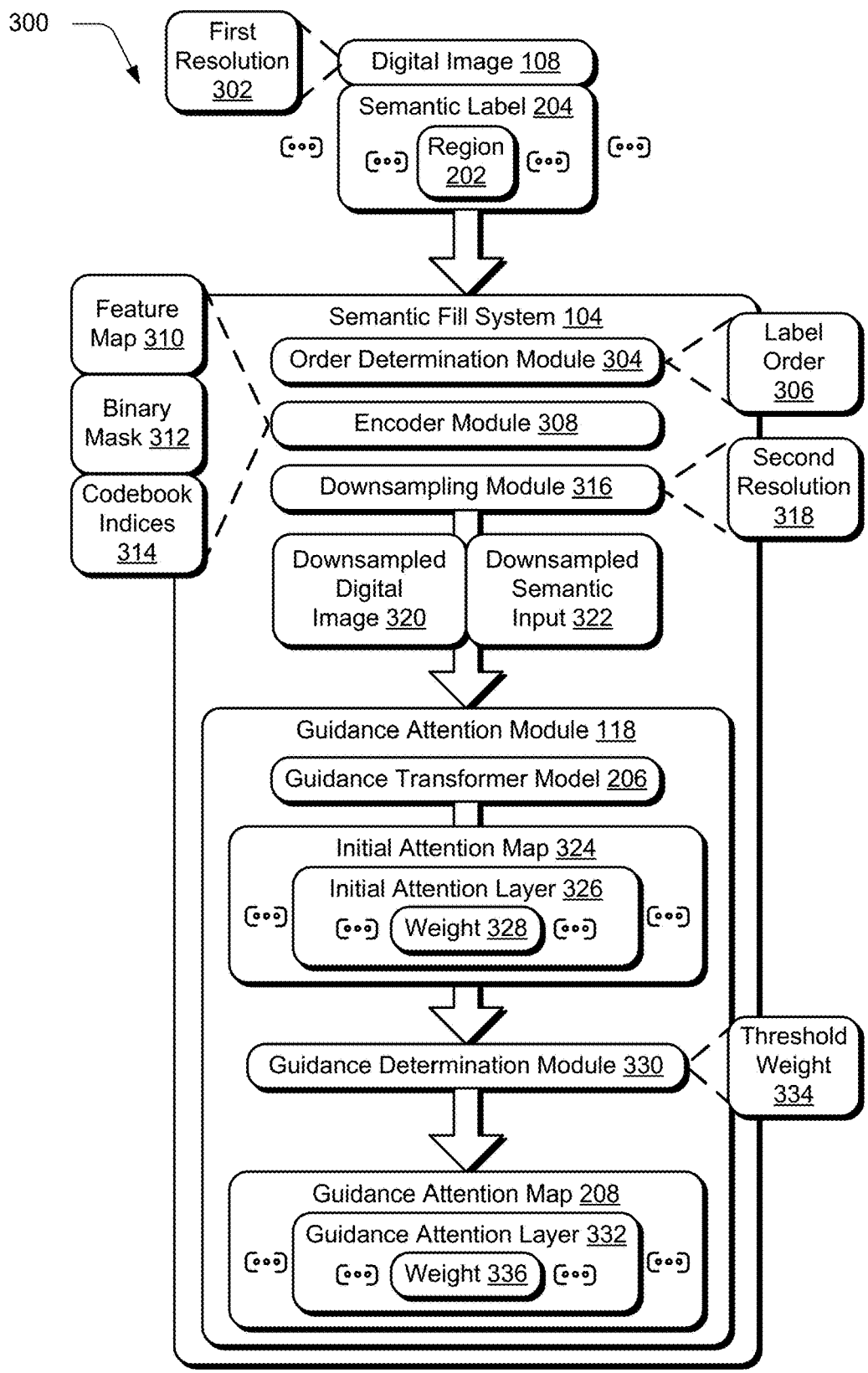
FIG. 3 depicts a system in an example implementation showing operation of a guidance attention module of the semantic fill system of FIG. 2 in greater detail.
Figure 4:
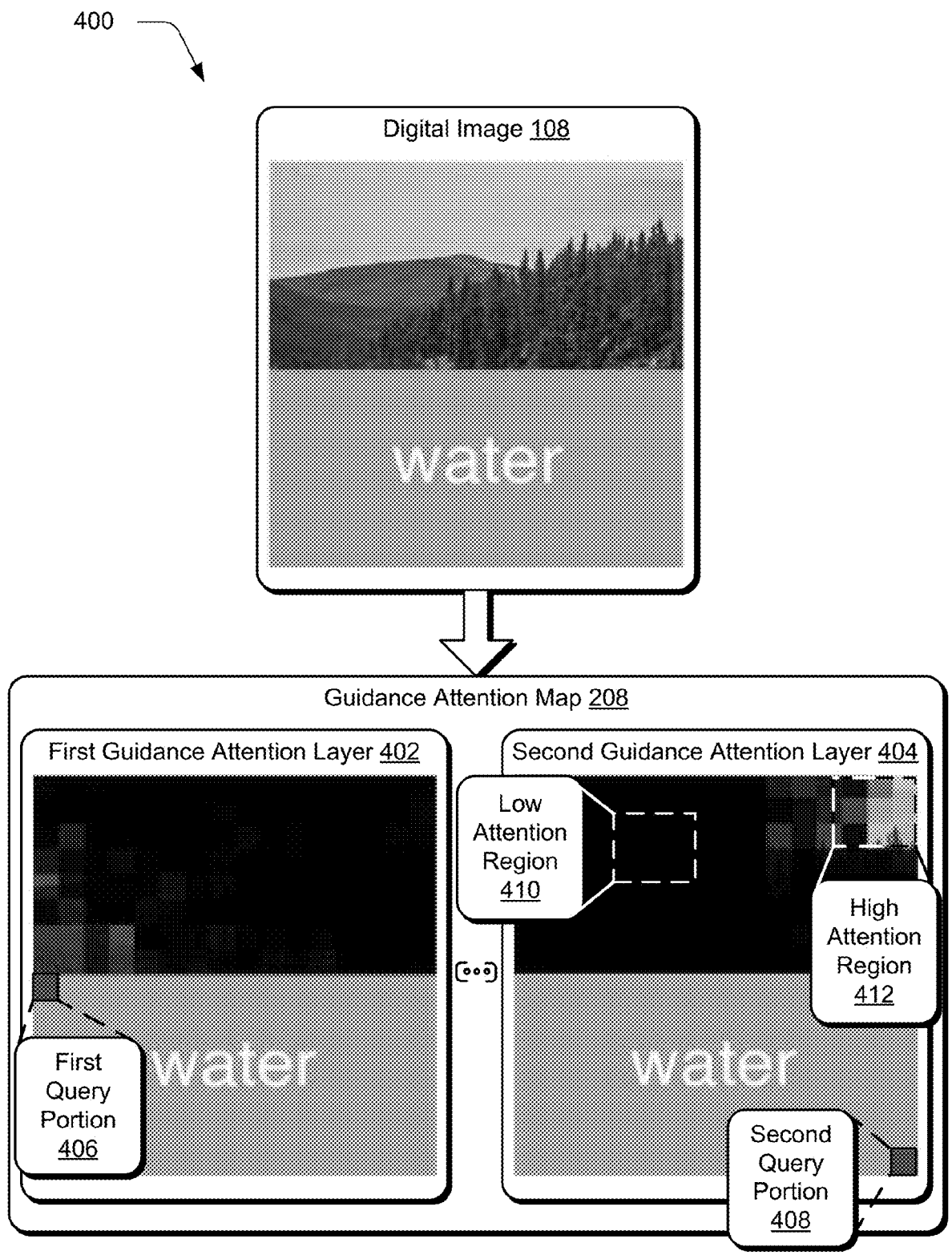
FIG. 4 depicts an example of guidance attention layers generated from a digital image.
Figure 5:
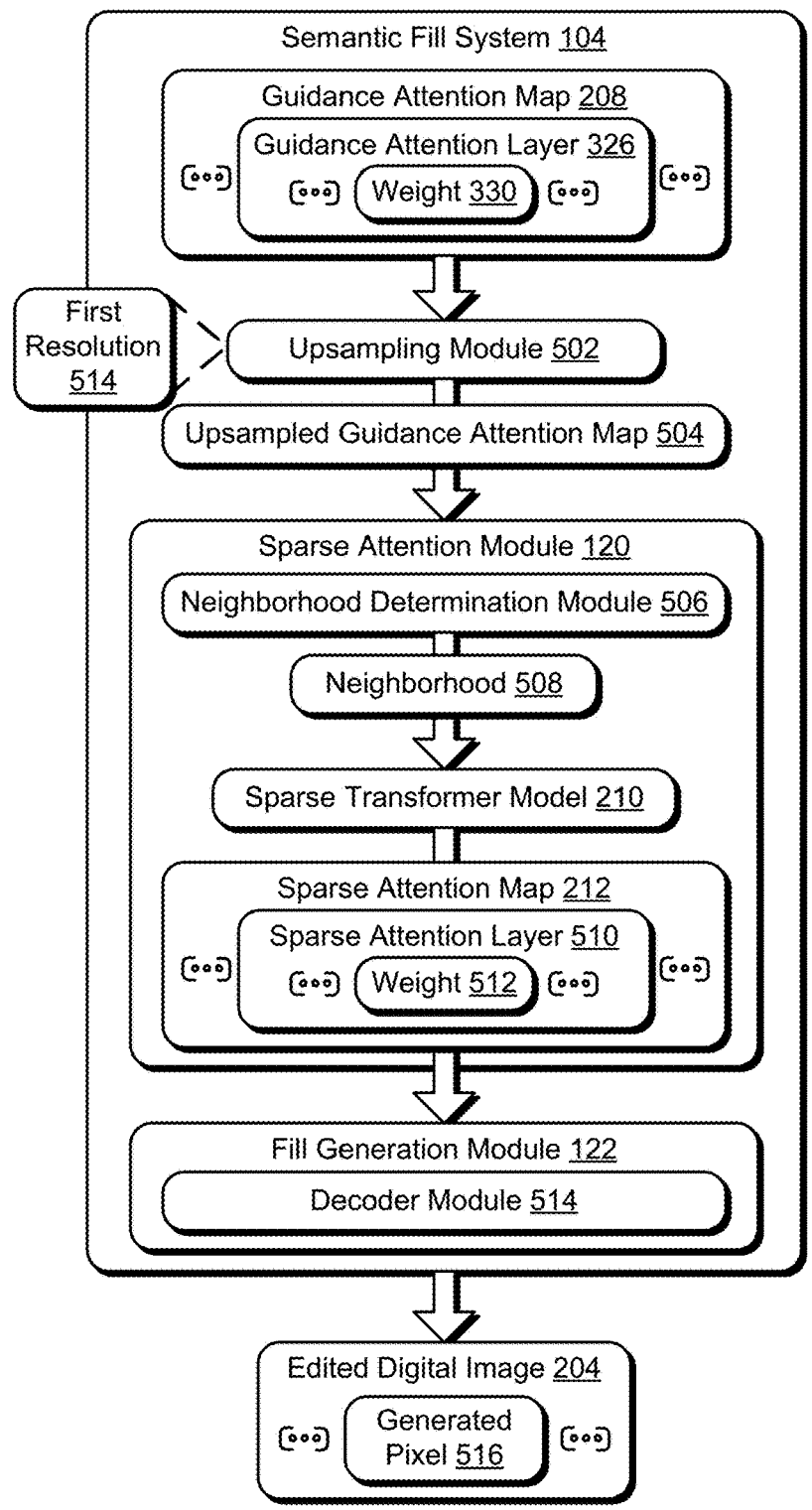
FIG. 5 depicts a system in an example implementation showing operation of a sparse attention module of the semantic fill system of FIG. 2 in greater detail.
Figure 6:
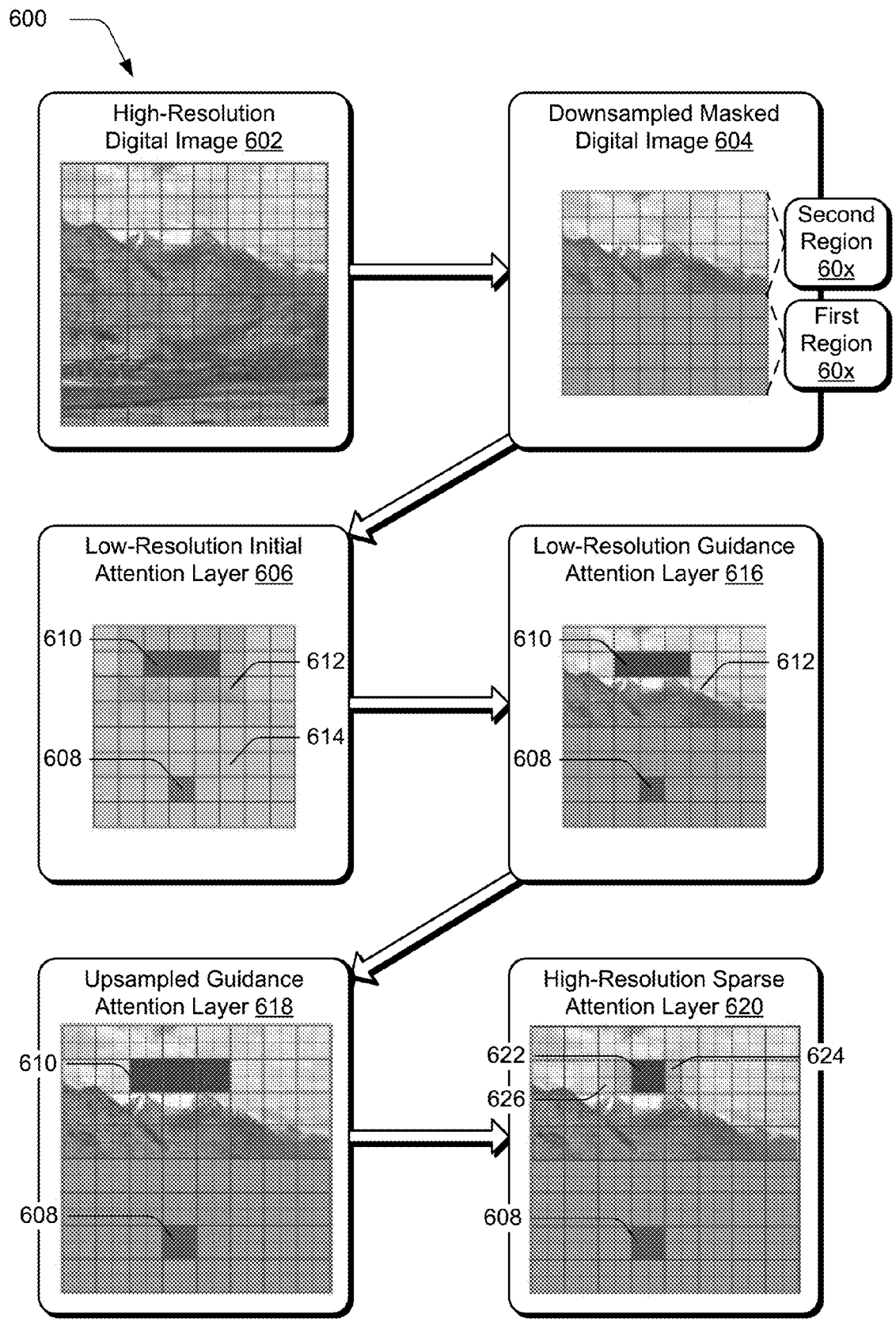
FIG. 6 depicts an example of guidance attention layers and sparse attention layers of FIGS. 3 and 5, respectively, in greater detail.
Figure 7:
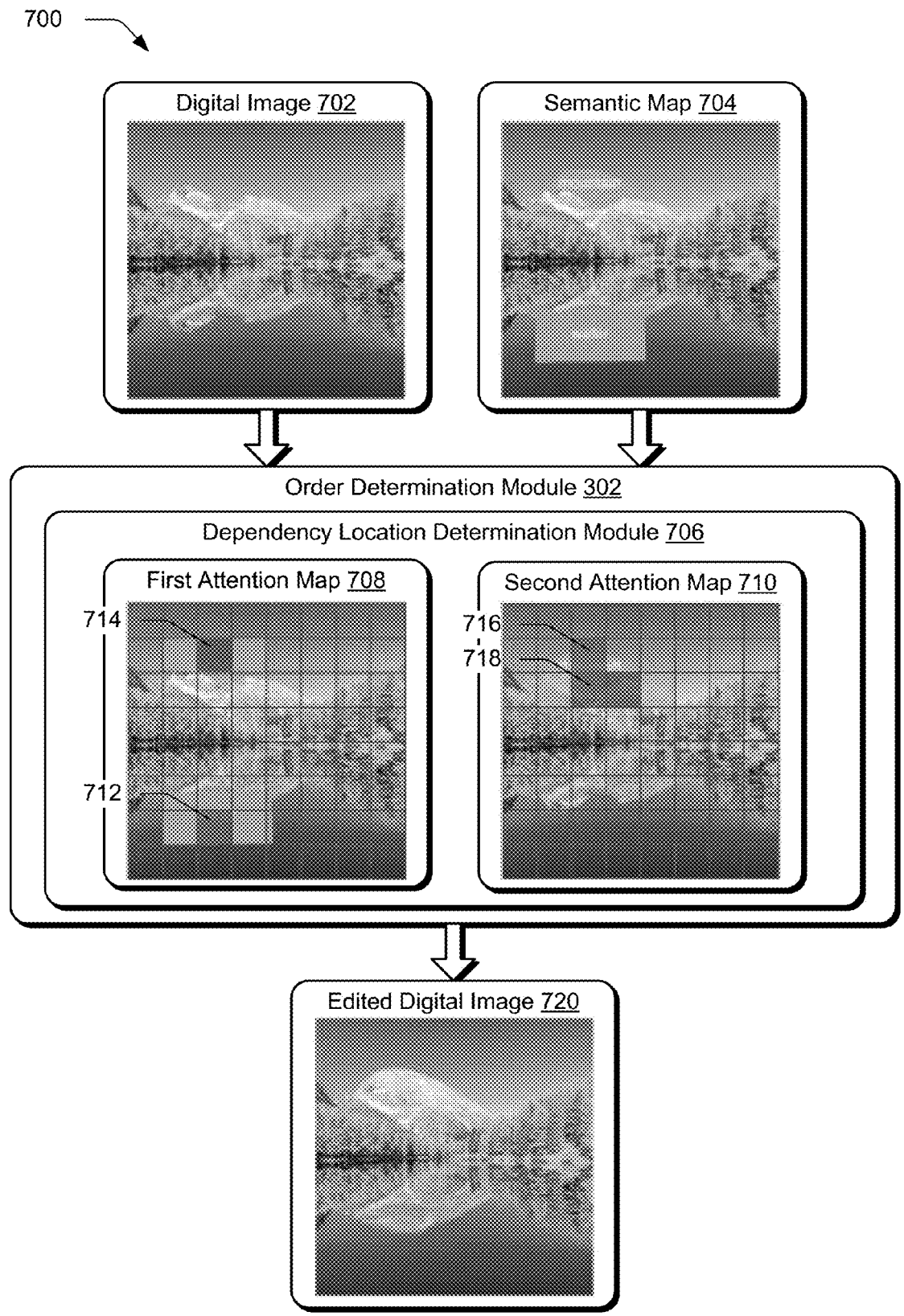
FIG. 7 depicts a system in an example implementation showing operation of an order determination module of the semantic fill system of FIG. 3 in greater detail.
Figure 8:
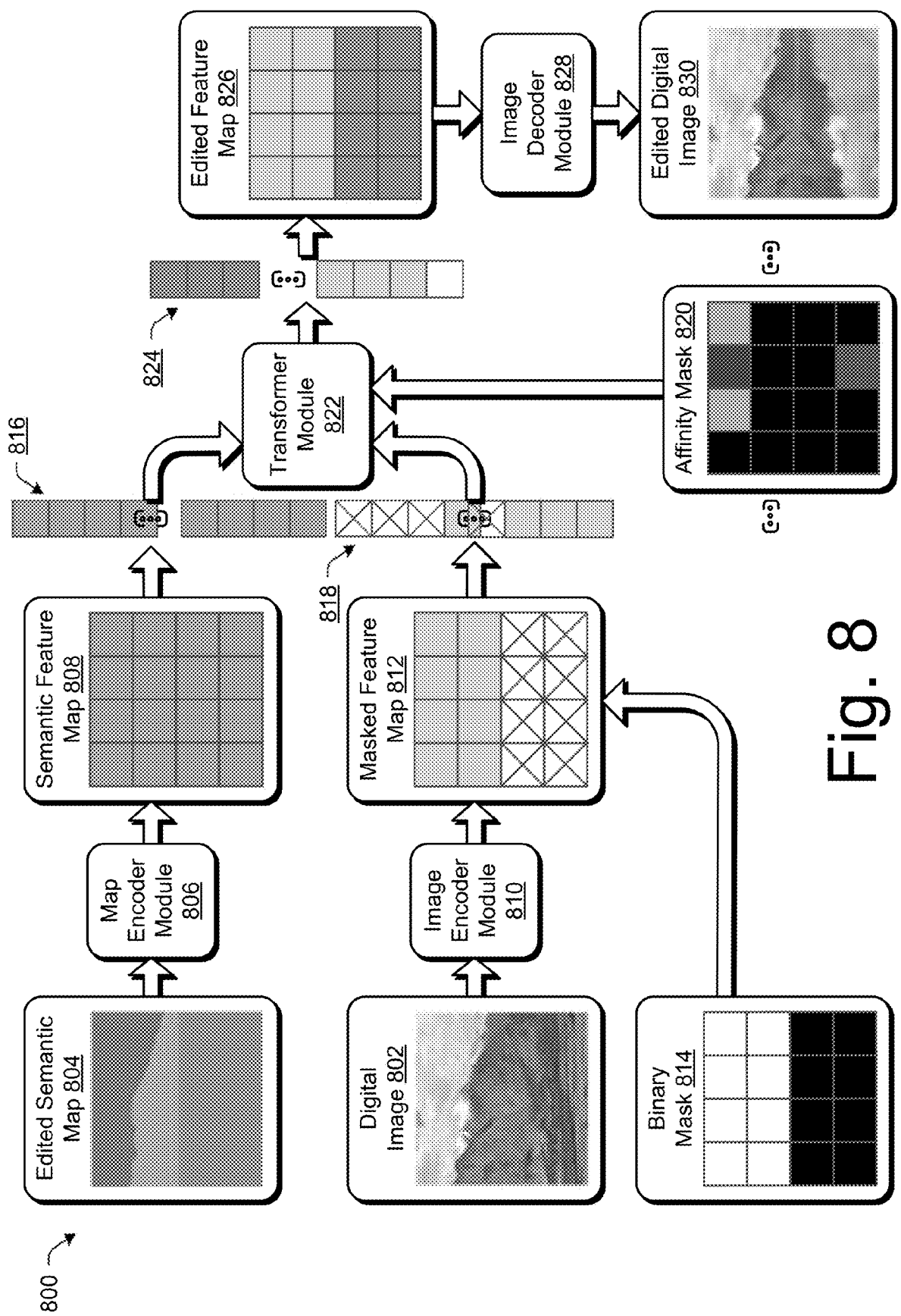
FIG. 8 depicts an example of generating an edited digital image.
Figure 9:
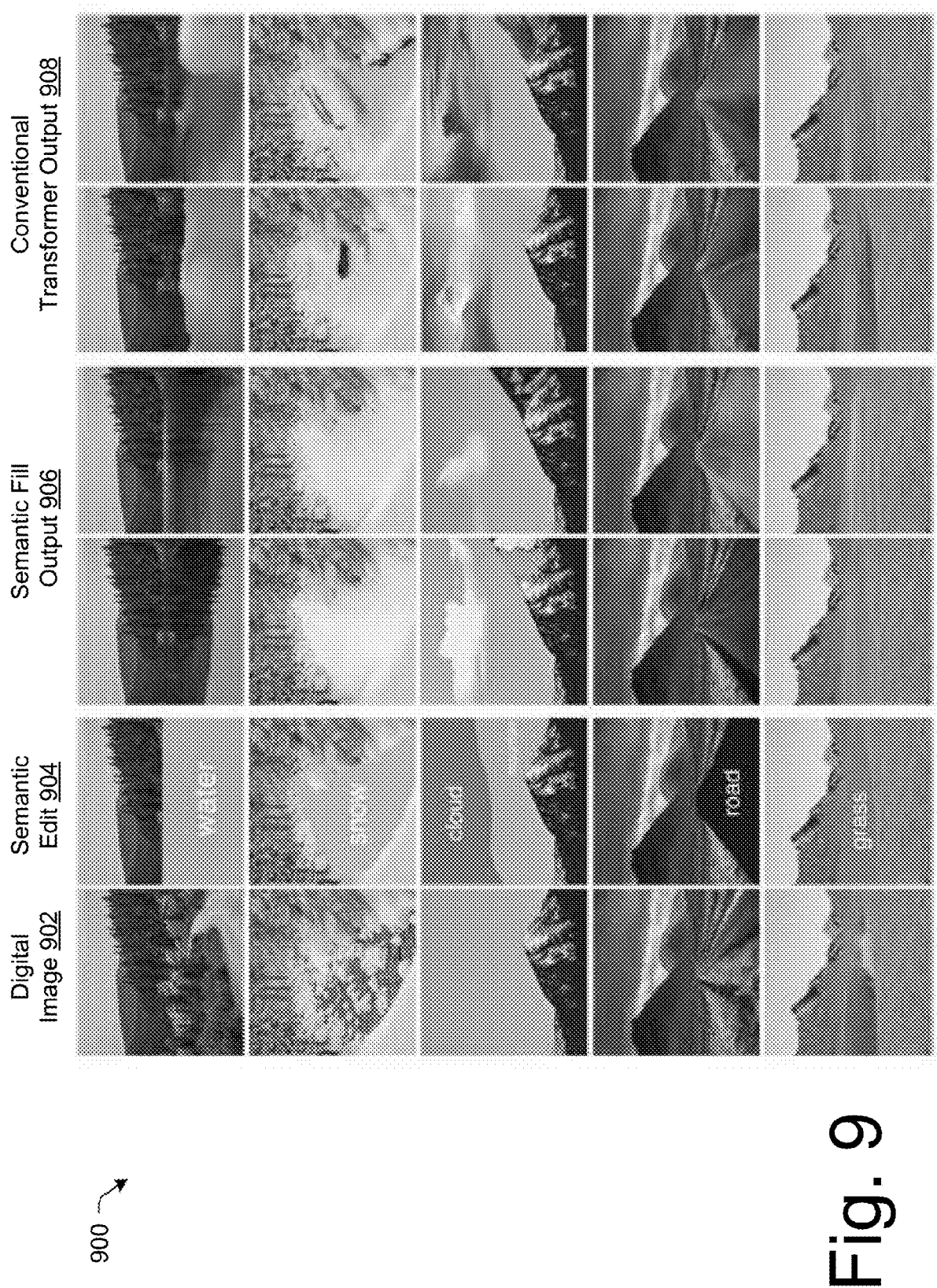
FIG. 9 depicts an example comparing outputs of conventional image fill techniques and semantic fill techniques.
Figure 10:
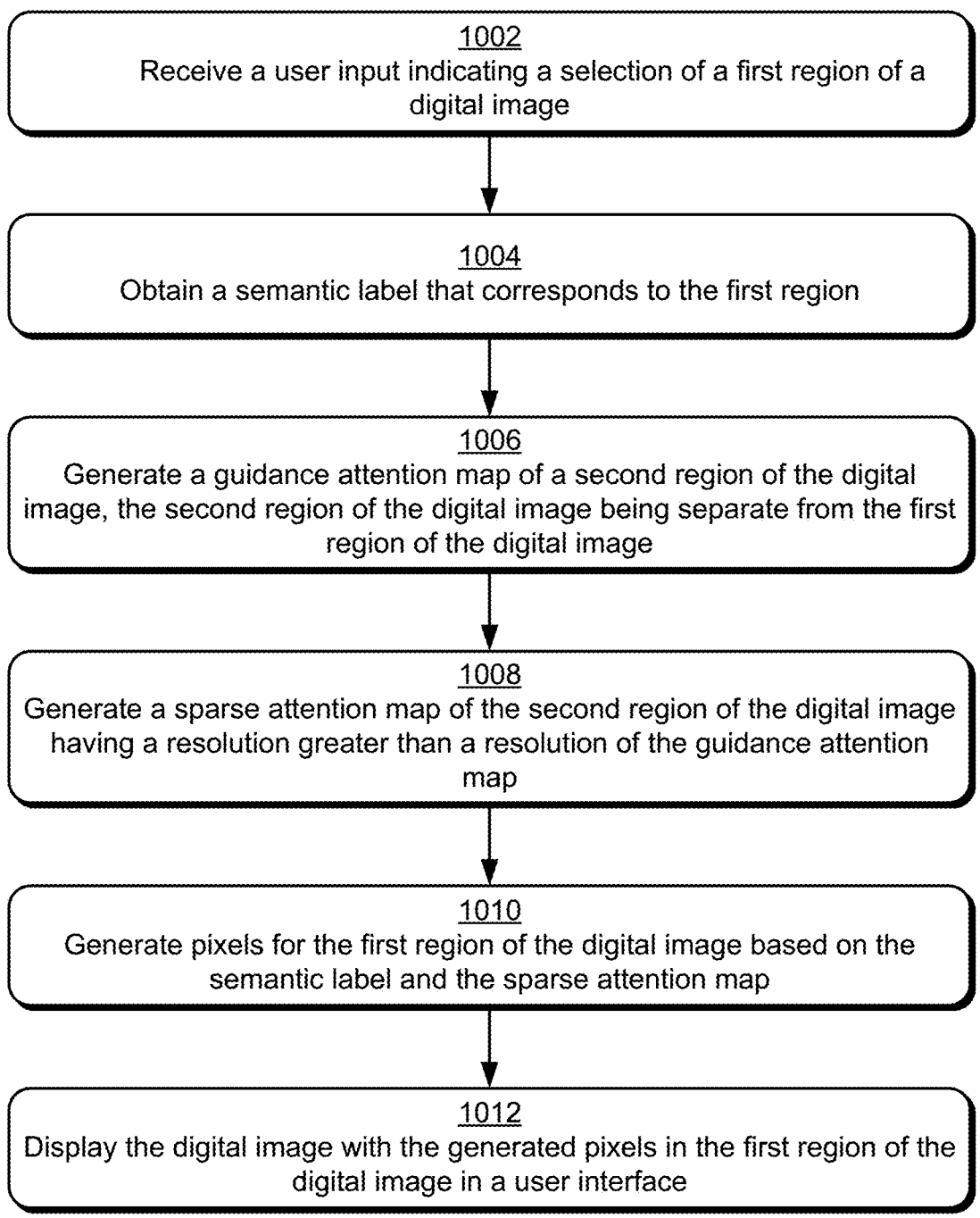
FIG. 10 is a flow diagram depicting a procedure in an example implementation of semantic fill of a digital image.

FIG. 2 depicts a system 200 in an example implementation showing operation of a semantic fill system 104 of FIG. 1 in greater detail. FIG. 3 depicts a system 300 in an example implementation showing operation of a guidance attention module 118 of the semantic fill system 104 of FIG. 2 in greater detail. FIG. 4 depicts an example 400 of guidance attention layers generated from a digital image. FIG. 5 depicts a system 500 in an example implementation showing operation of a sparse attention module 120 of the semantic fill system 104 of FIG. 2 in greater detail. FIG. 6 depicts an example 600 of guidance attention layers 332 and sparse attention layers 510 of FIGS. 3 and 5, respectively, in greater detail. FIG. 7 depicts a system 700 in an example implementation showing operation of an order determination module 304 of the semantic fill system 104 of FIG. 3 in greater detail. FIG. 8 depicts an example 800 of generating an edited digital image. FIG. 9 depicts an example 900 comparing outputs of conventional image fill techniques and semantic fill techniques. FIG. 10 is a flow diagram 1000 depicting a procedure in an example implementation of semantic fill of a digital image.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

To begin as shown in the system 200 of FIG. 2, a digital image 108 is received as an input by the semantic fill system 104. In some instances, the digital image 108 is displayed via the display device 112. In one instance, the semantic fill system 104 receives a user input indicating a selection of a region 202 of the digital image 108 (block 1002). Then, the semantic fill system 104 causes display of a text input area on the display device 112. The semantic fill system 104 obtains user input of a semantic label 204 that corresponds to the region 202 via the text input area (block 1004). In another instance, the semantic input including the semantic label 204 and the region 202 is retrieved from the storage device 110, e.g., via a mask or segmentation map edits.

The digital image 108, the semantic label 204, and the region 202 are utilized by the guidance attention module 118 based on a guidance transformer model 206 to generate a guidance attention map 208 at a resolution lower than the resolution of the digital image 108 (block 1006). As part of this, the guidance transformer model 206 is trained using machine learning to assign attention values to individual pixels or regions of the digital image, as described herein.

The guidance attention map 208 is leveraged by the sparse attention module 120 based on a sparse transformer model 210 to generate a sparse attention map 212 at the resolution of the digital image 108 (block 1008). The sparse attention map 212 is leveraged by the fill generation module 122 to generate pixels 214 to fill the region 202 of the digital image 108 based on the semantic label 204 (block 1010). The edited digital image 124 with the generated pixels 214 that fill the region 202 of the digital image 108 is displayed as an output on the display device 112 (block 1012).

FIG. 3 depicts a system 300 in an example implementation showing operation of a guidance attention module 118 of the semantic fill system 104 of FIG. 2 in greater detail. The semantic fill system 104 receives a digital image 108 having a first resolution 302, e.g., 1024×1024 pixels. In one example, a plurality of semantic labels 204 and corresponding regions 202 are received by the semantic fill system 104. An order determination module 304 is configured by the semantic fill system 104 to determine a label order 306 for the semantic inputs to be processed, as further described with respect to FIG. 7.

An encoder module 308 is configured by the semantic fill system 104 to generate representations of the digital image 108 and the semantic input 116. For example, the digital image 108 has an input height H, width W, and depth D, e.g., H=W=1024 and D=3 in a RGB input image. A feature mapping value FM (e.g., 16) is determined by the encoder module 308 based on the computing resources available. The encoder module 308 generates a feature map 310 of size $$h = \frac{H}{FM}, w = \frac{W}{FM},$$

and d for dimensionality based on the digital image 108, e.g., via a convolutional neural network encoding model.

The encoder module 308 also creates a binary mask 312 from the region 202. In some instances, the feature map 310 is generated such that the region 202 in the binary mask 312 does not affect the features in the unmasked region, e.g., information about the region 202 labeled "water" in semantic input 116 in FIG. 1 does not "leak" into the features in the unmasked region. In one instance, the encoder module 308 employs partial convolution models and/or region normalization models to enforce this masked region.

Then, the feature map 310 is quantized (e.g., via Vector Quantized Generative Adversarial Networks (VQGAN)) by the encoder module 308 based on a learned codebook Z. In some instances, the encoder module 308 maps each feature map entry $f_{i,j}$ at position (i,j) to the closest codebook entry, as described in Equation 1 below:

$$\hat{f}_{i,j} = \mathrm{argmin}_{z_k \in Z} \|f_{i,j} - z_k\| \qquad (1)$$

where $\{z_k\}_{k=1}^{|Z|}$ are codebook entries with dimensionality d.

In some instances, the encoder module 308 substitutes the codebook indices 314 of the region 202, as indicated by the binary mask 312, with a special mask token, as illustrated in FIG. 8 with an X in a masked feature map 812. The encoder module 308, for instance, also encodes the region 202 to obtain a semantic feature map and semantic codebook entries $\hat{g}_{i,j}$ of a semantic map of the digital image 108 with the semantic input 116, e.g., based on a second convolutional encoder model.

The encoder module 308 transforms the codebook indices $\hat{f}_{i,j}$, the semantic codebook indices $\hat{g}_{i,j}$, and position information for each index into a three-dimensional learned embedding, an image embedding, an embedding of the semantic token, and a positional embedding. In some instances, the encoder module 308 includes a bi-directional encoder to capture the bi-directional context of the digital image 108.

Then, a downsampling module 316 is configured by the semantic fill system 104 to reduce the resolution of the digital image 108 and the binary mask to a second resolution 318 that is less than the first resolution 302 of the digital image 108, e.g., 256×256 pixels. As a result, the downsampling module 316 generates a downsampled digital image 320 and a downsampled semantic input 322. For example, the downsampling module 316 splits the digital image 108 and/or a representation of the digital image (e.g., the feature map 310) into a set of non-overlapping portions. In one example, the feature map 310 is split up into portions of size h' and w', where $$h' = \frac{h}{n_h} \text{ and } w' = \frac{w}{n_w}.$$

These portions are illustrated in example FIG. 6, where $n_h = n_w = 8$. In one instance, the downsampled digital image 320 and the downsampled semantic input 322 are downsampled versions of the feature map of the digital image 108 and the binary mask 312. In another instance, the downsampled digital image 320 and the downsampled semantic input 322 are processed through the encoder module 308 to generate corresponding downsampled codebook indices that represent the downsampled digital image 320 and the downsampled semantic input 322 for attention mapping.

The guidance attention module 118 leverages a guidance transformer model 206 to generate an initial attention map 324. In some instances, the guidance transformer model 206 is configured as a machine learning model, such as a model using artificial intelligence, a neural network, a transformer, and so on. The initial attention map 324, for instance, includes initial attention layers 326 for each portion in the set of non-overlapping portions. Each portion is a query portion for a corresponding initial attention layer 326. The guidance transformer model 206 determines initial weights 328 based on the attention patterns between the query portion and the other portions.

In some instances, the guidance attention module 118 transforms each three-dimensional learned embedding into a learned query, value, and key representation of size L×d, where L=h·w is the length of the flattened codebook indices. The output embedding is computed by the guidance attention module 118, e.g., as a $$\text{softmax}\left(\frac{\text{Query} * \text{Key}^T}{\sqrt{d}}\right) \text{Value},$$

resulting in a matrix of outputs that describes the interactions across all the portions of the codebook indices of the downsampled digital image 320 and the downsampled semantic input 322 in the sequence. In one instance, the initial weights 328 are generated based on the output embedding.

In some instances, the initial weights 328 are generated between portions in the $n_h \times n_w$ grid. The initial weights 328 between portions in the initial attention layers 326 are represented in matrix $B \in \{0,1\}^{N \times N}$, where $N = n_h \cdot n_w$ is the total number of portions. For example, an attention weight of 1 between a first portion and a second portion (B(a,b)=1) means that all indices inside the first portion attend to indices of the second portion, whereas an attention weight of 0 between a first portion and a second portion (B(a,b)=0) indicates no interaction between indices of these portions.

The initial attention map 324 including the initial attention layers 326 is leveraged by a guidance determination module 330 configured by the semantic fill system 104 to generate a guidance attention map 208. For instance, the guidance determination module 330 generates guidance attention layers 332 as part of the guidance attention map 208 based on a corresponding initial attention layer 326. In some instances, for each portion as a query portion of an initial attention layer 326, the guidance determination module 330 compares the initial weights 328 of the initial attention layer 326 to a threshold weight 334. The guidance determination module 330 selects a subset of portions based on corresponding initial weights 328. For example, the subset of portions is selected based on a threshold weight 334, e.g., 0.8 such that only portions with an initial weight 328 greater than 0.8 are selected. In another example, the selected portions are determined by ranking the initial weights 328 (i.e., the importance of each portion) and selecting a threshold number of relevant portions. The resulting guidance attention layer 332 has guidance weights 336, where the selected portions have corresponding initial weights 328, and the portions not selected are assigned a guidance weight 336 of 0. In some instances, a downsampled edited image is generated by the guidance attention module 118.

In the example illustrated in FIG. 4, the guidance attention map 208 includes a first guidance attention layer 402 and a second guidance attention layer 404, e.g., pure black corresponds to a low attention weight (0) and pure white corresponds to a high attention weight (1). The first guidance attention layer 402 has a first query portion 406. The second guidance attention layer 404 has a second query portion 408. The second query portion 408 has a low attention region 410 and a high attention region 412. The high attention region 412 is a region of high relative relevance or importance that the second guidance attention layer 404 will indicate to the sparse attention module 120, such that the high attention region 412 is prioritized in subsequent sparse attention mapping. The low attention region 410 is a region of low relative relevance or importance, such that it can be ignored or less emphasized. In some instances, a dependency location, e.g., a region where the attention is high such as region 412, is not adjacent to the query portion, such that a long-range dependency is identified.

In FIG. 5, an upsampling module 502 is configured by the semantic fill system 104 to upsample the guidance attention map from the second resolution 314 to the first resolution 302, e.g., 1024×1024 pixels. As a result, the upsampling module 502 generates a upsampled guidance attention map 504. The sparse attention module 120 receives the upsampled guidance attention map 504 to guide the sparse attention mapping. In some instances, the upsampled guidance attention map 504 and the digital image 108 are split up into smaller non-overlapping portions. In one instance, each portion has a corresponding sparse attention layer 510 for which the portion is the query portion.

A neighborhood determination module 506 is configured by the sparse attention module 120 to determine a neighborhood 508 for each query portion. For example, the neighborhood 508 is a set of portions that includes at least some immediate neighboring portions and/or additional connected neighboring portions. In some instances, the number of neighboring portions in the neighborhood 508 is determined based on a threshold neighborhood value.

Once the neighborhood 508 and relevant portions (e.g., from a corresponding guidance attention layer 332) are determined, the sparse attention module 120 leverages a sparse transformer model 210 to generate a sparse attention map 212 of the digital image 108. In some instances, the sparse transformer model 210 is configured as a machine learning model, such as a model using artificial intelligence, a neural network, a transformer, and so on. The sparse attention map 212, for instance, includes a sparse attention layer 510 for each portion in the set of non-overlapping portions. The sparse transformer model 210 determines sparse weights 512 based on the attention patterns between the query portion and the other portions. For instance, the portions of the digital image 108 that are not part of the neighborhood 508 or the relevant portions of the corresponding guidance attention layer 332 are ignored, or the sparse weight of the portion is set to 0. The portions of the neighborhood 508 or the relevant portions of the corresponding guidance attention layer 332 are analyzed and weighted accordingly by the sparse transformer model 210. In some instances, the resulting sparse attention map is highly sparse, e.g., the sparsity ratio is less than 10%.

The sparse attention map 212 is leveraged by the fill generation module 122 to generate semantic fill for the region 202. In some instances, a decoder module 514 is configured by the fill generation module 122 to generate pixel values based on the learned features of the attention mappings. The decoder module 514 predicts codebook indices for the region 202 based on the global context derived from the encoder. In some instances, the decoder module initializes the autoregressive generation of pixels by prepending a special index (e.g., "Start") to the decoder input. For each index, the decoder module 514 predicts a distribution over the codebook indices from the learned codebook Z from the encoder module 308.

In some instances, the decoder module 514 predicts codebook indices $P(\lambda_l | \{\lambda_{<l}\})$, where $\lambda_l$ is a categorical random variable representing a codebook index to be generated at position l in the sequence and $\{\lambda_{<l}\}$ are all indices of the previous steps. In one instance, the decoder generates distributions only for positions corresponding to the region 202, i.e., the codebook indices for positions not corresponding to the region 202 are unchanged or set to the codebook indices of the digital image 108. In some instances, to predict the output distribution at each step, the decoder module 514 identifies the learned embeddings from the encoder module 308. The decoder module 514 sums the learned embedding representing a portion of the image $\lambda_l$ and a learned positional embedding for the position of that portion l.

The decoder module 514 determines the self-attention layer by identifying attention between predicted tokens and modifies the self-attention layer to prevent tokens from attending to subsequent positions. The decoder module 514 determines the cross-attention layer by identifying attention between predicted tokens and the encoder output features. To determine the self- and cross-attention layers, the decoder module 514 leverages the embedding sum and the sparse attention map 212.

The decoder module 514 then retrieves and decodes the feature map 310 into an edited digital image 124 at the first resolution 302 with generated pixels 516. In some instances, only the pixels that correspond to the region 202 are generated in the edited digital image 124, i.e., the other pixels remain the same. In one instance, the fill generation module performs post-processing, such as the application of a Laplacian pyramid image blending around the borders of the region 202 in the edited digital image 124. The final edited digital image 124 is presented to the user on the display device 112.

In some instances, the decoder module 514 utilizes top-k sampling to create a plurality of candidate output sequences, which are mapped by the decoder module 514 to generate a plurality of edited digital images 124. For instance, the pixels to be generated are sampled autoregressively based on a likelihood-based model, e.g., a model using machine learning. The decoder module 514 generates a diverse set of digital image outputs based on randomness from the likelihood-based model, all of which are consistent with the overall image characteristics. These edited digital images 124, for instance, are then ordered by the decoder module 514 based on the joint probability of the distributions predicted by the decoder module 514.

The models (e.g., the image encoders and decoders, the transformer encoders and decoders, the guidance transformer model 206, the sparse transformer model 210) are trained using machine learning. In some instances, the semantic fill system 104 randomly samples free-form masks and use the semantic information in the masked area as semantic inputs. In one instance, the models are trained in a supervised manner on training images which contain ground-truth for masked regions. The semantic fill system 104 trains the guidance transformer model 206 with low-resolution training images (e.g., images of 256×256 resolution) on the full training image. Following that, the semantic fill system 104 trains the sparse transformer model 210 with the sparse guided attention on high-resolution images, e.g., images of 1024×1024 resolution. In some instances, the weights of the sparse transformer model 210 is initialized from the previously trained guiding transformer model 206, and trained with incrementally higher resolutions, e.g., trained with 512×512 resolution images and again with 1024×1024 resolution images.

In the example FIG. 6, a high-resolution digital image 602 is received by the semantic fill system 104, along with a semantic edit. A binary mask is generated based on the semantic input 116 by the encoder module 308. The binary mask identifies two regions, a first region masked for applying the semantic edit, and a second region separate from the first region. The high-resolution digital image 602 is downsampled, and the binary mask is applied to generate a downsampled masked digital image 604 by the downsampling module 316. The downsampled masked digital image 604 is leveraged by the guidance attention module 118 to generate a low-resolution initial attention layer 606. The low-resolution initial attention layer 606 includes a query portion 608, a high-attention portion 610, a medium-attention portion 612, and a low-attention portion 614. The low-resolution initial attention layer 606 is processed by the guidance determination module 330 based on the attention weights of the low-resolution initial attention layer 606 to generate a low-resolution guidance attention layer 616. In some instances, the high-attention portions 610 and corresponding attention weights are preserved in the low-resolution guidance attention layer 616 and the medium-attention portions 612 and the low-attention portions 614 are set to 0. The low-resolution guidance attention layer 616 is upsampled by the upsampling module 502 to generate an upsampled guidance attention layer 618. This upsampled guidance attention layer 618 is leveraged by the sparse attention module 120 to generate a high-resolution sparse attention layer 620. In some instances, the sparse attention module 120 identifies high-resolution sparse attention layer 620 The high-resolution sparse attention layer 620 includes the query portion 608, a high-attention portion 622 a medium-attention portion 624, and a low attention portion 626.

In the example system 700 of FIG. 7, the order determination module 304 of the semantic fill system 104 determines a label order 306 of the semantic labels 204. For example, as illustrated in FIG. 7, a digital image 702 and a semantic map 704 are received by the order determination module 304. In this example, the semantic map 704 includes two semantic inputs, a first region corresponding to a first semantic label of "water" and a second region corresponding to a second semantic label of "mountain".

A dependency location determination module 706 is configured by the order determination module 304 to identify dependencies between the two semantic inputs. The order determination module 304 generates a first attention map 708 corresponding to the first semantic label of "water" and a second attention map 710 corresponding to the second semantic label of "mountain". The dependency location determination module 706 compares the first attention map 708 and the second attention map 710 to determine whether there is overlapping dependencies, e.g., regions where the attention weights are high in both attention maps. In this example, the first attention map 708 for a first query portion 712 has high-attention portions 714 at proximate in location (e.g., within a threshold distance) on the digital image 702 as the second query portion 716 and second high-attention portions 718, i.e., the reflection of the "water" will depend on the "mountain." In contrast, the "mountain" will not depend on the "water." Accordingly, the second semantic label and the second region is ordered for processing before the first semantic label and the first region. In another example, the order determination module 304 determines that two or more semantic labels 204 are to be processed concurrently. An edited digital image 720 is generated based on the label order.

In FIG. 8, a digital image 802 and an edited semantic map 804, e.g., including a semantic map of the digital image and a semantic edit of a semantic label and a region of the digital image 802, are received by encoder modules to generate feature maps. A map encoder module 806 generates a semantic feature map 808 based on the edited semantic map 804. An image encoder module 810 generates a masked feature map 812 based on the digital image 802 and a binary mask 814. The binary mask 814 is generated from the region of the semantic edit on the edited semantic map 804. The semantic feature map 808 and the masked feature map 812 are transformed into respective codebook indices 816 and 818.

These codebook indices 816 and 818 are passed to a transformer module 822 (e.g., the guidance attention module 118 and the sparse attention module 120) to predict the codebook indices for the masked features. Additionally, an affinity mask 820 is passed to the transformer module 822. Each affinity mask 820 for a given query portion identifies portions of the masked feature map 812 to which the transformer module 822 is to attend, e.g., a guidance attention layer. As such, the transformer module 822 generates edited codebook indices 824. The edited codebook indices are decoded into an edited feature map 826, e.g., by a decoder module 514 as described herein. An image decoder module 828 decodes the edited feature map 826 and generates an edited digital image 830. This functionality allows a user to easily edit a given image by modifying a semantic map (e.g., a segmentation map) and add or remove regions of the semantic map by considering the global context across the digital image 802.

FIG. 9 depicts an example comparing outputs of conventional fill techniques and the semantic fill techniques described herein. A digital image 902 and a semantic edit 904 are processed by the semantic fill techniques to produce semantic fill outputs 906 and by the traditional transformer techniques to produce traditional transformer outputs 908. Traditional transforming is a conventional solution to generate content from digital images in which a transformer only attends to a small area around a query portion, thereby reducing the computational cost to a fixed budget. While these techniques can transform high-resolution images, the traditional transforming lacks long-range dependency modeling. This leads to inconsistencies when edits are dependent on image regions that are far away in pixel space, e.g., when generating a reflection. In contrast, a semantic fill output 906 generated from the semantic fill system 104 effectively and efficiently captures the long-range dependencies in an image by efficiently determining a limited set of relevant locations that are worth attending to at a low resolution and computing a high-resolution attention map only over these locations and neighboring locations. By leveraging the sparse guided attention techniques, the semantic fill system 104 generates more semantically relevant and more accurate semantic fill outputs 906 as compared to conventional techniques. Additionally, the semantic fill techniques produce a more realistic output, reducing user interaction, and thus reducing the computational resources used to generate an edited image. Accordingly, the semantic fill techniques as described herein is an improvement over the conventional techniques.

Example System and Device

Figure 11:
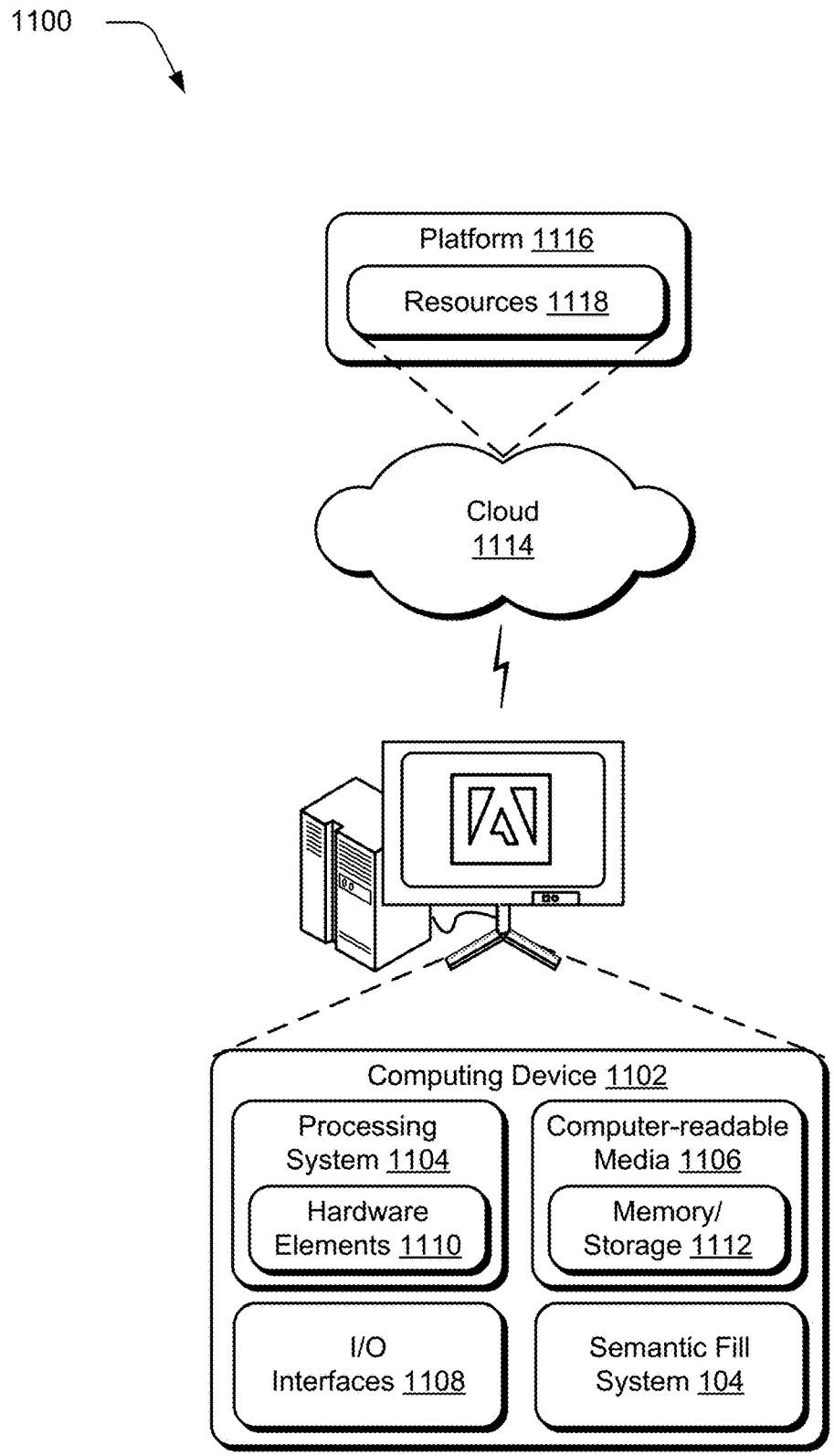
FIG. 11 illustrates an example system including various components of an example device that can be implemented as any type of computing or processing device as described and/or utilize with reference to FIGS. 1-10 to implement embodiments of the techniques described herein.

FIG. 11 illustrates an example system generally at 1100 that includes an example computing device 1102 that is representative of one or more computing or processing systems and/or devices that implement the various techniques described herein. This is illustrated through inclusion of the semantic fill system 104. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random-access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a user input indicating a selection of a first region of a digital image;
   obtaining, by the processing device, a semantic label that corresponds to the first region;
   generating, by the processing device, a guidance attention map of a second region of the digital image, the second region of the digital image being separate from the first region of the digital image;
   generating, by the processing device, a sparse attention map of the second region of the digital image having a resolution greater than a resolution of the guidance attention map;
   generating, by the processing device, pixels for the first region of the digital image based on the semantic label and the sparse attention map; and
   displaying, by the processing device, the digital image with the generated pixels in the first region of the digital image in a user interface.

2. The method as recited in claim 1, wherein the guidance attention map is generated based on a first model trained using machine learning, and the sparse attention map is generated based on a second model trained using machine learning.

3. The method as recited in claim 1, wherein the sparse attention map is generated based on the guidance attention map.

4. The method as recited in claim 1, further comprising splitting the digital image into first portions of the first region and second portions of the second region.

5. The method as recited in claim 4, wherein the guidance attention map includes a plurality of guidance attention layers, each guidance attention layer corresponding to one of the first portions as a query portion.

6. The method as recited in claim 5, further comprising generating a guidance attention layer by:
   generating an initial attention layer of the second region for the query portion, each of the second portions having a corresponding attention weight; and
   determining a guidance attention layer by selecting a subset of the second portions based on the corresponding attention weights.

7. The method as recited in claim 6, further comprising generating a sparse attention layer based on the guidance attention layer for the query portion, each of the subset of the second portions having a corresponding sparse attention weight.

8. The method as recited in claim 1, wherein the semantic label indicates a type of attention map.

9. A system comprising:
   a memory component; and
   a processing device coupled to the memory component, the processing device to perform operations comprising:
   obtaining a digital image, a semantic label, and a first region of the digital image that corresponds to the semantic label;
   generating a guidance attention map of a second region of the digital image that is outside of the first region;
   generating a sparse attention map of the second region based on the guidance attention map, a resolution of the guidance attention map is less than a resolution of the sparse attention map; and
   editing the digital image by generating pixels for the first region based on the semantic label and the sparse attention map.

10. The system as recited in claim 9, the operations further comprising:
    downsampling the digital image to the resolution of the guidance attention map; and
    upsampling the guidance attention map to the resolution of the sparse attention map.

11. The system as recited in claim 9, wherein the guidance attention map is generated based on a first model trained using machine learning, and the sparse attention map is generated based on a second model trained using machine learning.

12. The system as recited in claim 11, wherein the second model trained using machine learning is trained based on the guidance attention map.

13. The system as recited in claim 12, the operations further comprising identifying guidance portions of the digital image based on the guidance attention map, and wherein the sparse attention map is generated for the guidance portions.

14. A non-transitory computer-readable storage medium storing executable instructions, which when executed by a processing device, cause the processing device to perform operations comprising:
    receiving a semantic input that includes a selection of a first region of a digital image and a semantic label that corresponds to the first region;
    generating a guidance attention map of a second region of the digital image that is separate from the first region of the digital image;
    generating a sparse attention map of the second region of the digital image having a resolution greater than a resolution of the guidance attention map;
    generating pixels for the first region of the digital image based on the semantic label and the sparse attention map; and
    presenting the digital image with the generated pixels in the first region of the digital image.

15. The non-transitory computer-readable storage medium as described in claim 14, wherein the sparse attention map is generated based on the guidance attention map.

16. The non-transitory computer-readable storage medium as described in claim 14, wherein the guidance attention map is generated based on a guidance transformer model trained using machine learning.

17. The non-transitory computer-readable storage medium as described in claim 14, wherein the sparse attention map is generated based on a sparse attention model trained using machine learning.

18. The non-transitory computer-readable storage medium as described in claim 14, wherein the generating the guidance attention map includes downsampling the digital image to the resolution of the guidance attention map.

19. The non-transitory computer-readable storage medium as described in claim 14, wherein the generating the sparse attention map includes upsampling the guidance attention map to the resolution of the sparse attention map.

20. The non-transitory computer-readable storage medium as described in claim 14, the operations further comprising:
  receiving an additional semantic input that includes an additional selection and an additional semantic label;
  identifying one or more dependencies between the semantic input and the additional semantic input; and
  determining a label order to process the semantic input and the additional semantic input based on the one or more dependencies.

* * * * *